E. H. RINE.
BOTTLE CAP EXTRACTOR.
APPLICATION FILED JULY 20, 1921.
1,436,291.
Patented Nov. 21, 1922.
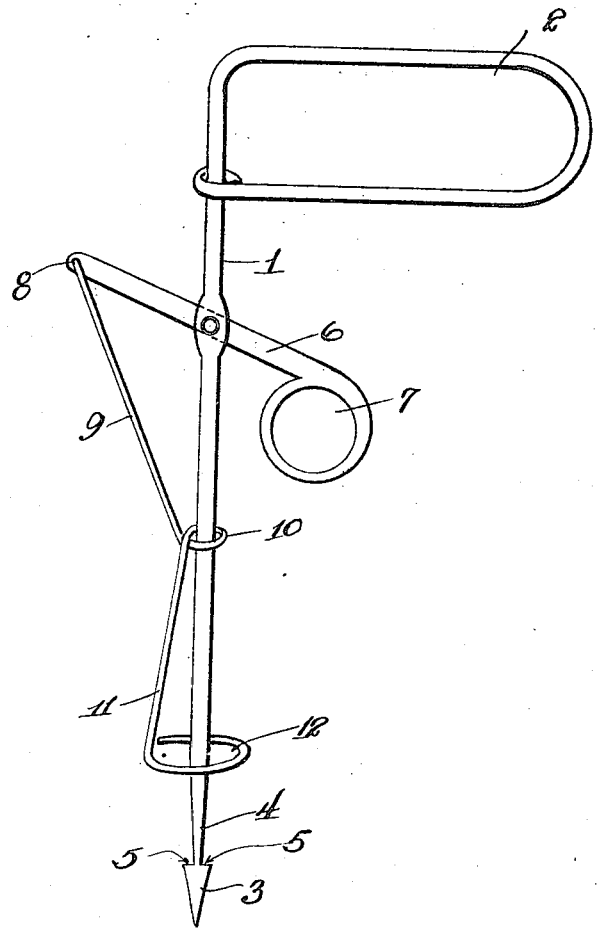
Inventor
Earl. H. Rine.

Patented Nov. 21, 1922.

1,436,291

UNITED STATES PATENT OFFICE.

EARL H. RINE, OF WASHINGTON, PENNSYLVANIA.

BOTTLE-CAP EXTRACTOR.

Application filed July 20, 1921. Serial No. 486,054.

*To all whom it may concern:*

Be it known that I, EARL H. RINE, a citizen of the United States, residing at Washington, in the county of Washington and State of Pennsylvania, have invented certain new and useful Improvements in Bottle-Cap Extractors, of which the following is a specification.

This invention relates to milk bottle cap extractors and more particularly to an improved implement for moving the caps from milk bottles and for ejecting the cap from the implement after the cap has been extracted from the bottom.

One of the objects of the invention is to provide an implement of this character which will permit the milk bottle cap to be readily removed in a quick and efficient manner and which will be adapted to be conveniently operated for thrusting the cap from the implement to which it has been attached while being removed.

Other objects will appear upon consideration of the following detail description and accompanying drawings, wherein:—

The figure illustrates a side view of the implement constructed in accordance with my invention.

Referring to the drawing by numerals, the shank 1 is of any desired length and is provided at its upper end with a handle or hand grip 2 formed by bending the shank in the form shown whereby the user may obtain a firm grip on the upper end of the implement. The opposite end of the shank is provided with a spear point 3 substantially triangular in formation, and the shank at this point is reduced and tapered in diameter as indicated at 4 so that oppositely disposed abutment shoulders 5 are formed on the large end of the spear point 3.

Mounted upon the shank near the handle 2 is a lever 6 having a finger grip 7 at one end and an opening 8 at the other end to receive one end of a connecting rod 9 which is provided with a sliding loop 10 adapted to longitudinally reciprocate on the shank 1 as indicated in the drawing. From this loop, the arm 11 extends, the lower end of which carries an ejector 12 which encompasses the shank 1 and is adapted to move longitudinally on the shank when the lever 6 is actuated.

In use, the implement will be grasped by the handle 2 while the finger lever 6 is held in the position shown in full lines so that the spear point 3 may be thrust into the bottle cap. Then by gently pulling on the implement the bottle cap can be extracted from the bottle, and of course, will cling to the end of the shank by virtue of its engagement with the abutment shoulder 5. In order that the cap may be quickly discharged or ejected from the implement, the operator will place one of his fingers in the opening 7 and pull on the lever 6 causing the member 12 to engage the bottle cap and thrust it from the end of the implement so that the entire operation is accomplished without the operator touching the bottle cap.

Minor changes may be made in the details of construction without departing from the spirit of the invention or the scope of the claims hereunto appended.

What is claimed is:—

1. An implement of the character described comprising a shank having a handle at one end, a point substantially triangular in formation at the opposite end, the said triangular point, shank and handle being formed from a single piece of wire, shoulders formed on said triangular point for engagement with the underside of a bottle cap, a lever pivoted intermediate its ends to the shank of the implement, and means slidable on said shank connected to one end of said lever for disengaging the bottle cap from the shank when the lever and handle are compressed together.

2. An implement of the character described comprising a shank having a handle at one end, a point substantially triangular in formation at the opposite end, said triangular point, shank and handle being formed from a single piece of wire, shoulders formed on said triangular point for engagement with the underside of a bottle cap, a lever pivoted intermediate its ends to the shank of the implement, a cap disengaging means slidable on said shank and constructed from a single piece of wire, an enlarged bearing loop formed in one end of said wire for engagement with the bottle cap and the opposite end of said wire connected with said 5 lever whereby the bottle cap may be disengaged from the shank upon pressing the lever and handle together.

In testimony whereof, I have affixed my signature in the presence of two witnesses.

EARL H. RINE

Witnesses:
PORTER J. DOAK,
GLENN BEADY.